UNITED STATES PATENT OFFICE.

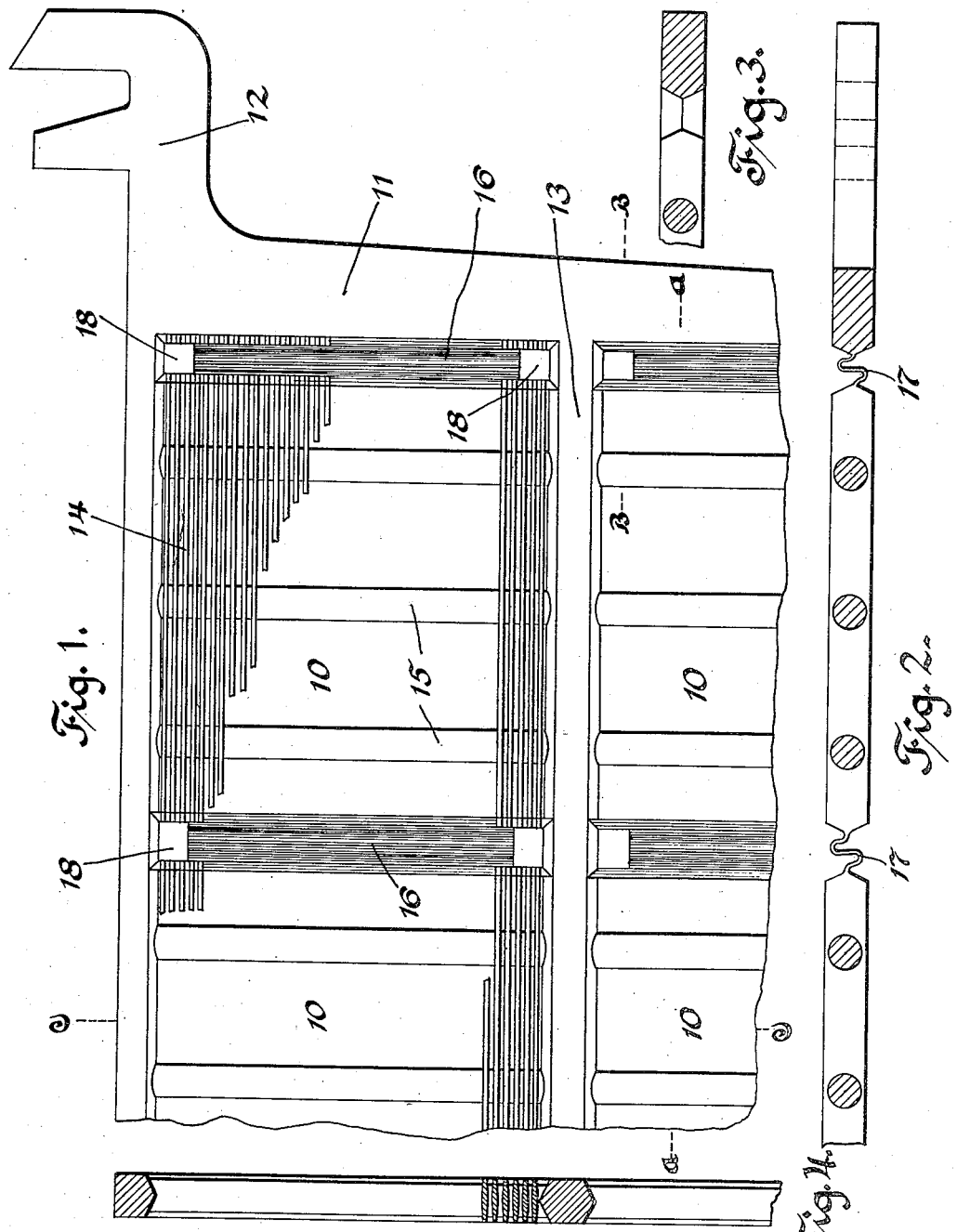

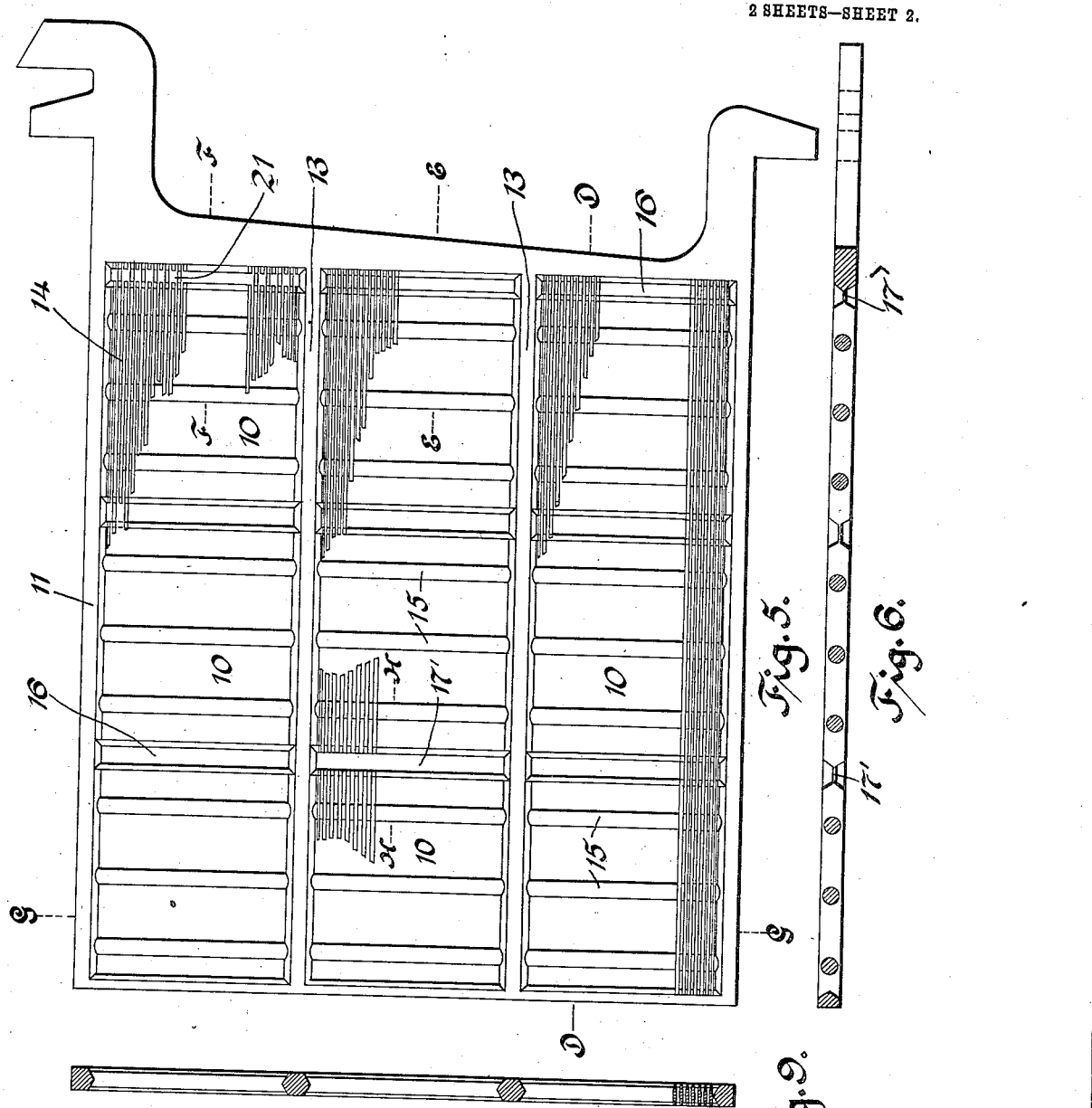

LOUIS H. FLANDERS, OF WILKINSBURG, PENNSYLVANIA, ASSIGNOR TO THE WESTINGHOUSE MACHINE COMPANY, A CORPORATION OF PENNSYLVANIA.

STORAGE-BATTERY ELECTRODE.

935,252.  Specification of Letters Patent.  Patented Sept. 28, 1909.

Application filed December 15, 1905. Serial No. 291,891.

*To all whom it may concern:*

Be it known that I, LOUIS H. FLANDERS, a citizen of the United States, and a resident of Wilkinsburg, in the county of Allegheny and State of Pennsylvania, have invented a new and useful Improvement in Storage-Battery Electrodes, of which the following is a specification.

This invention relates to storage battery electrodes and has for an object the production of an electrode in which effective means are utilized for accommodating the lateral and longitudinal growth encountered.

A further object is the production of an electrode in which effective means are utilized for permitting internal growth, and at the same time rendering the electrode effective in resisting the cross bending or buckling strains encountered. This and other objects I attain in electrodes embodying the features herein described and illustrated.

In the drawing accompanying this application and forming a part thereof; Figure 1 is a partial elevation of a plate or electrode embodying my invention. Fig. 2 is a section along the line A A of Fig. 1. Fig. 3 is a section along the line B B of Fig. 1. Fig. 4 is a section along the line C C of Fig. 1. Fig. 5 is an elevation of a plate embodying various structural modifications of my invention. Fig. 6 is a section along the line D D of Fig. 5. Fig. 7 is a section along the line E E of Fig. 5. Fig. 8 is a section along the line F F of Fig. 5. Fig. 9 is a section along the line G G of Fig. 5. Fig. 10 is a section along the line H H of Fig. 5.

Referring to Fig. 1: the plate or electrode comprises a number of panels 10 in a common plane included within a frame 11 which is provided with mounting and connecting lugs 12 and a suitable number of longitudinally extending stiffening ribs 13. Each panel comprises a complete electrode and consists of a plurality of longitudinally extending leaves or laminæ 14 and a suitable number of laterally extending conducting or stiffening ribs 15 which are mounted between the frame portion 11 and a vertical rib 13 or between two vertical ribs, according to the position of the panel. The leaves 14 constitute in effect the active portion of the electrode and are spaced far enough apart to permit of the lateral growth occasioned by the formation of peroxid of lead on their surfaces. While each leaf is practically surrounded by active material and presents four sides to the action of the electrolyte, it is of ample section to furnish, by subsequent corrosion, active material to replace that deposited on the bottom of the cell and is of sufficient section to provide ample conductivity. The leaves 14 are connected by the stiffening or conducting ribs 15 and the longitudinal growth is accommodated by expansion joints 16 arranged between the ends of adjacent panels which consist of a thin web portion 17 connecting the ends of the leaves 14 of each adjacent panel. A slot 18 is cut in either end of the web 17 and the web is corrugated longitudinally, thereby rendering the joint flexible and at the same time adding to the lateral stiffness of the electrode. The lateral stiffening or conducting ribs 15 are of circular cross section and are formed wholly within the confines of the plate; that is, their diameters are less than the width of the leaves 14, the edges of which are uninterrupted at the points of connection. The stiffening ribs are of sufficient sectional area to provide ample conductivity and they also present a minimum surface to corrosive action. The slots 18 in the web 17 of the expansion joint, besides rendering the joint more flexible, are large enough to allow the specific gravity of the electrolyte to equalize on both sides of the plate more rapidly than the percolation through the interstices between the laminæ or leaves 14 will permit.

In certain sizes it is found unnecessary to include the expansion joint 16 between the ends of the panels 10 and the frame portion 11 of the electrode as the intermediate joints are capable of accommodating themselves to the longitudinal growth encountered.

In Fig. 5 four different modifications of the expansion joint are shown. The section along the line D D as shown in Fig. 6 illustrates an arrangement of the expansion joint in which the web portion 17 is dispensed with; the sectional area of each laminæ or leaf, however, is reduced at the expansion joint, thus forming a weak section 17′ which will readily distort to accommodate the longitudinal growth or the expansion of the electrode. A section along the line E E of Fig. 5, shown in Fig. 7 illustrates a modification of the joint shown in Fig. 6. The reduced portion of the laminæ is initially distorted, thereby doubly insuring a flexible expansion joint. Section F F as represented in Fig. 8 shows an arrangement in which the web 17 of the expansion joint is undistorted and is provided with a number of slots 21 illustrated in Fig. 5. This expansion joint, as in Fig. 6, consists of a weakened section which will readily distort when subjected to compression stresses. Section H H as shown in Fig. 10 illustrates an expansion joint in which the web 17 connecting the ends of adjacent panels is a thin sheet of uniform thickness which, on account of its thin section, will readily distort and accommodate the longitudinal growth of the electrode.

The principal features of the electrode aside from the fact that the growth encountered is accommodated by the specific construction, is that the frame portion, the main stiffening ribs, the laminæ or leaves, the round conducting ribs and the expansion joints are integrally formed; the entire plate being rolled or otherwise formed in one operation. By this arrangement a plate of high conductive capacity is obtained and no part of it is liable to become electrically isolated due to unequal expansion or corrosion.

A special feature of the expansion joint as illustrated in Figs. 1 and 2 is that the more the web portion 17 is distorted by the longitudinal growth of the plate the stronger the plate becomes in resisting cross bending or buckling. The slots in the expansion joints as illustrated in the modifications are effective in overcoming to some extent the buckling tendency due to unequal discharge inasmuch as they permit of a rapid diffusion of the electrolyte, thereby equalizing its specific gravity or density on opposite sides of the plate.

It is obvious that while I have shown several modifications of my invention, other arrangements and constructions may be utilized and still fall within the limits and scope of this invention.

What I claim as new and useful and desire to secure by Letters Patent is:

1. An electrode comprising a plurality of panels and flexible means connecting adjacent ends of said panels.

2. An electrode comprising a plurality of panels and a flexible web connecting adjacent ends of said panels.

3. An electrode comprising a plurality of panels and a corrugated flexible web connecting adjacent edges of said panels.

4. An electrode comprising a plurality of panels, and flexible means connecting adjacent ends of said panels and in the plane of said panels.

5. An electrode comprising a plurality of spaced unitary panels and expansion joints between longitudinally adjacent panels, which comprise corrugated sections.

6. An electrode comprising a plurality of spaced unitary panels and expansion joints between longitudinally adjacent panels, which comprise corrugated and weakened sections.

7. An electrode comprising a plurality of spaced unitary panels in combination with expansion joints located between longitudinally adjacent panels, which are provided with openings or slots and are adapted to be laterally distorted.

8. An electrode comprising a plurality of panels, and flexible webs connecting the edges of longitudinally adjacent panels, said electrode having openings therethrough at the respective ends of said web.

9. An electrode comprising a frame, a plurality of panels and flexible webs connecting said frame to the ends of said panels adjacent thereto.

In testimony whereof, I have hereunto subscribed my name this 13th day of December, 1905.

LOUIS H. FLANDERS.

Witnesses:
 DAVID WILLIAMS,
 E. W. McCALLISTER.